(12) United States Patent
Yang et al.

(10) Patent No.: US 9,472,237 B1
(45) Date of Patent: Oct. 18, 2016

(54) SYSTEMS AND METHODS FOR SIDE-TRACK AIDED DATA RECOVERY

(71) Applicant: Avago Technologies General IP (Singapore) Pte. Ltd., Singapore (SG)

(72) Inventors: Yuqing Yang, Shanghai (CN); Shaohua Yang, San Jose, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 0 days.

(21) Appl. No.: 14/697,566

(22) Filed: Apr. 27, 2015

(51) Int. Cl.
*G11B 5/035* (2006.01)
*G11B 5/58* (2006.01)
*G11B 20/10* (2006.01)

(52) U.S. Cl.
CPC .............. *G11B 20/10212* (2013.01)

(58) Field of Classification Search
CPC . G11B 2220/20; G11B 2220/90; G11B 5/09; G11B 19/04; G11B 15/04; G11B 20/100009; G11B 5/035; G11B 5/012; G11B 5/58; G11B 5/584; G11B 5/488; G11N 5/59655

USPC .............. 360/39, 55, 45, 60, 65, 48, 77.01
See application file for complete search history.

(56) References Cited

U.S. PATENT DOCUMENTS

| | | | |
|---|---|---|---|
| 8,830,612 B2* | 9/2014 | Worrell | G11B 5/012 360/39 |
| 8,848,305 B2 | 9/2014 | Xiao et al. | |
| 2014/0160590 A1 | 6/2014 | Sankaranarayanan et al. | |
| 2015/0015983 A1 | 1/2015 | Jeong et al. | |

OTHER PUBLICATIONS

U.S. Appl. No. 13/618,317, filed Sep. 14, 2012, Xiao.
U.S. Appl. No. 14/148,306, filed Jan. 6, 2014, Pan.
Chang "Inter-Track Interference Mitigation for Bit-Patterned Magnetic Recording" IEEE vol. 46, Issue 11 Nov. 2010.

* cited by examiner

*Primary Examiner* — Nabil Hindi

(57) ABSTRACT

Embodiments of the present inventions are related to systems and methods for data processing, and more particularly to systems and methods for reducing inter-track interference in relation to processing data retrieved from a storage medium.

21 Claims, 9 Drawing Sheets

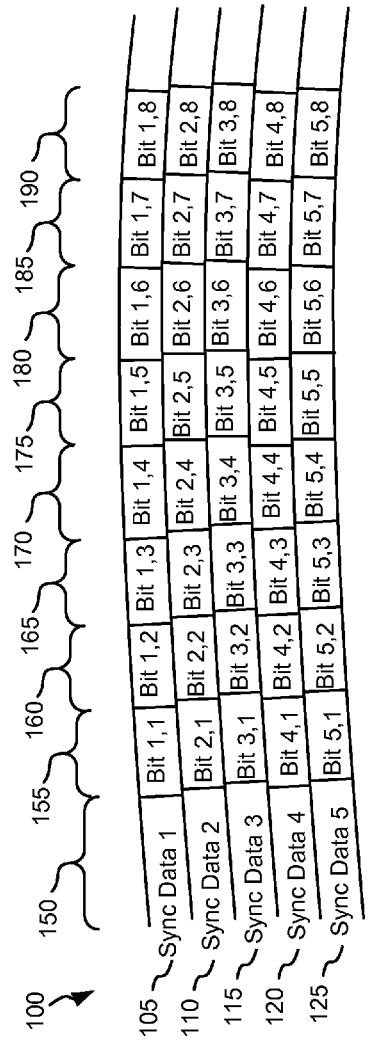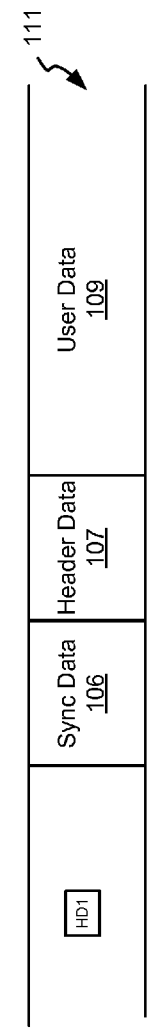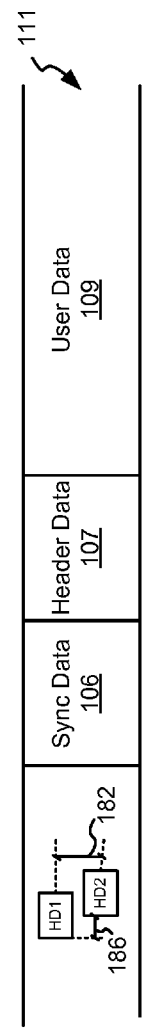

SYSTEMS AND METHODS FOR SIDE-TRACK AIDED DATA RECOVERY

BACKGROUND

Embodiments of the present inventions are related to systems and methods for data processing, and more particularly to systems and methods for reducing inter-track interference in relation to processing data retrieved from a storage medium.

The density of data stored on storage media continues to increase which results in increasing interference between adjacent regions on the storage medium. To properly recover data stored to the storage medium, it is useful to eliminate or mitigate such interference. Failure to properly account for interference from adjacent regions results in diminished accuracy of read back data.

Hence, for at least the aforementioned reasons, there exists a need in the art for advanced systems and methods for inter-track interference compensation.

BRIEF SUMMARY

Embodiments of the present inventions are related to systems and methods for data processing, and more particularly to systems and methods for reducing inter-track interference in relation to processing data retrieved from a storage medium.

Some embodiments of the present invention provide data processing systems that include: an analog to digital converter circuit, an inter-track interference mitigation circuit, and an equalizer circuit. The analog to digital converter circuit is operable to convert an analog input into a series of digital samples. The inter-track interference mitigation circuit is operable to reduce inter-track interference from the series of digital samples to yield a corrected series of samples. The equalizer circuit is operable to apply an equalization algorithm to the corrected series of samples to yield an equalized output.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 1b depicts an existing track to track layout of data on a storage medium;

FIG. 1c shows alignment of a single head reader with a track on a storage medium;

FIG. 1d shows alignment of a multi-head reader with a track on a storage medium;

DETAILED DESCRIPTION

Figure 1A:
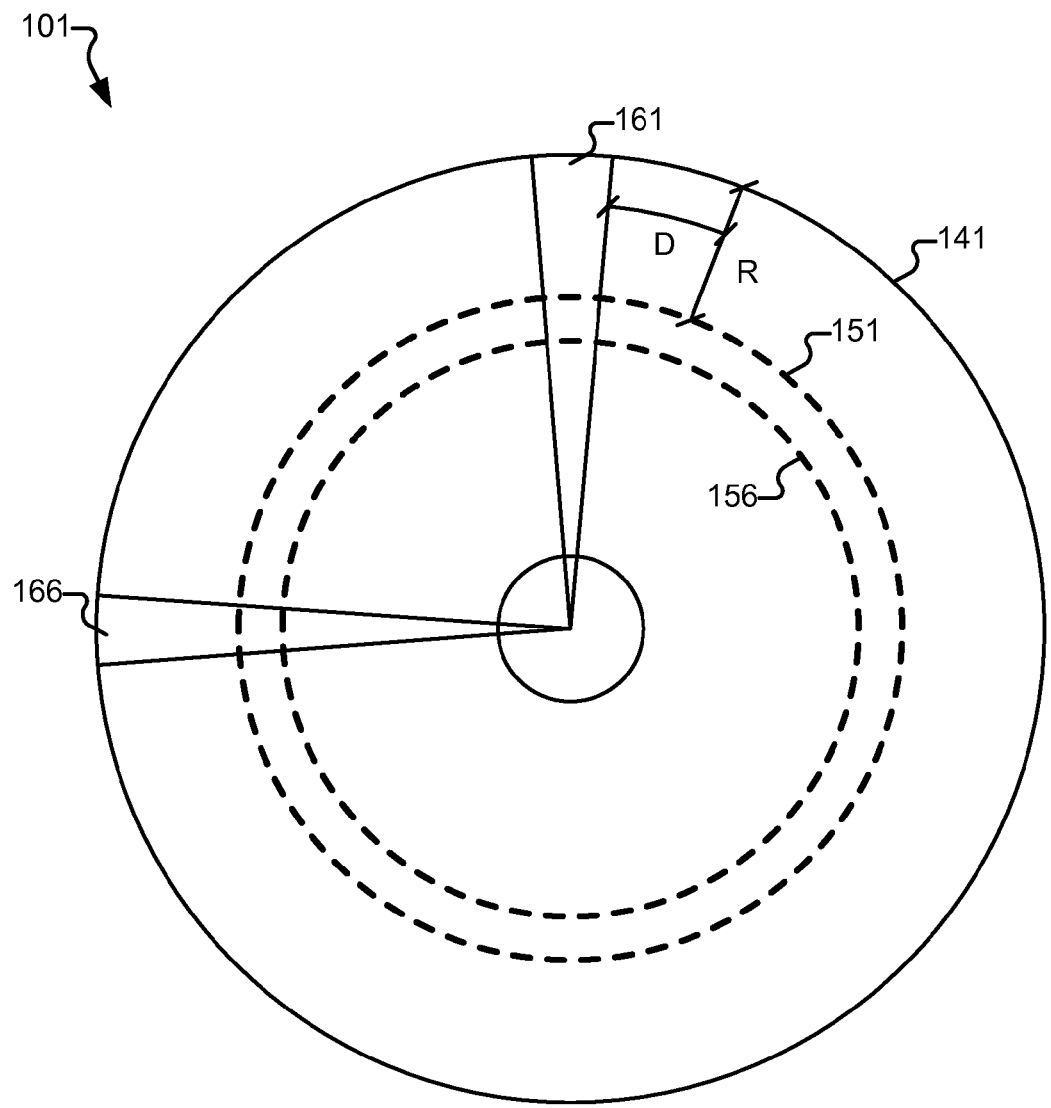
FIG. 1a depicts an existing storage medium including servo data.

Embodiments of the present inventions are related to systems and methods for data processing, and more particularly to systems and methods for reducing inter-track interference in relation to processing data retrieved from a storage medium.

Some embodiments of the present invention provide data processing systems that include: an analog to digital converter circuit, an inter-track interference mitigation circuit, and an equalizer circuit. The analog to digital converter circuit is operable to convert an analog input into a series of digital samples. The inter-track interference mitigation circuit is operable to reduce inter-track interference from the series of digital samples to yield a corrected series of samples. The equalizer circuit is operable to apply an equalization algorithm to the corrected series of samples to yield an equalized output. In some instances of the aforementioned embodiments, the system further includes a data processing circuit operable to apply a combination of a data detection algorithm and a data decoding algorithm to the equalized output to yield an originally written data set. In some cases, the system is implemented as part of an integrated circuit. In various cases, the system is incorporated in a hard disk drive including a storage medium that includes a track from which the analog input is derived, and an adjacent track that is adjacent to the track from which the analog input is derived.

In various instances of the aforementioned embodiments, the inter-track interference mitigation circuit includes a filter circuit and a summation circuit. The filter circuit is operable to filter a data set derived from a track adjacent to the track from which the analog input is derived to yield inter-track interference values corresponding to the analog input. The summation circuit is operable to subtract the inter-track interference values from the series of digital samples to yield the corrected series of samples. In some such instances, the filter circuit is a digital finite impulse response circuit governed by a plurality of filter taps. In various such instances, the data set derived from the track adjacent to the track from which the analog input is derived may be either an x-sample data set, or a y-sample data set. In particular such instances, the data set derived from the track adjacent to the track from which the analog input is derived is generated by re-reading the track adjacent to the track from which the analog input is derived. In various such instances, the data set derived from the track adjacent to the track from which the analog input is derived is generated by buffering data generated during prior processing of the data set as derived from the track adjacent to the track from which the analog input is derived.

In various instances of the aforementioned embodiments, the equalizer circuit is a digital finite impulse response circuit. In some instances of the aforementioned embodiments, the equalizer circuit is a recursive equalizer circuit including a buffer circuit operable to hold a previous equalized output.

It should be noted that while discussion herein is directed at canceling inter-track interference from an adjacent side track, various embodiments of the present invention provide for canceling inter-track interference from side tracks on both sides of a target track. In such cases, the inter-track interference mitigation circuit is operable to reduce inter-track interference from the series of digital samples by calculating first estimated inter-track interference values from a first side of a target track and second estimated inter-track interference values from a second side of a target track to yield a corrected series of samples. Further, it should be noted that while the claims specifically address use of one or two readers, all such claims would cover a situation including three or more readers.

Other embodiments provide methods for inter-track interference cancellation that include: converting an analog input into a series of digital samples; using a filtering circuit to filter a data set derived from a track adjacent to the track from which the analog input is derived to yield inter-track interference values corresponding to the analog input; subtracting the inter-track interference values from the series of digital samples to yield the corrected series of samples; and applying an equalization algorithm to the corrected series of samples to yield an equalized output.

Data storage systems often store data arranged in tracks. FIG. 1a shows a storage medium 101 with two exemplary tracks 151, 156 indicated as dashed lines. The tracks are segregated by servo data written within wedges 161, 166 (i.e., servo wedges). These wedges include data and supporting bit patterns 111 that are used for control and synchronization of the read/write head assembly over a desired location on storage medium 101. In particular, these wedges generally include a preamble pattern 192 followed by a sector address mark 194 (SAM). Sector address mark 194 is followed by a Gray code 196, and Gray code 196 is followed by burst information 198. It should be noted that while two tracks and two wedges are shown, hundreds of each would typically be included on a given storage medium. User data is stored at bit period locations between successive servo wedges.

FIG. 1b shows an existing track to track layout 100 of data on a storage medium. Of note, track to track layout 100 includes only some of the data across some of the tracks that would be expected on an existing storage medium. As shown, layout 100 includes a number of tracks 105, 110, 115, 120, 125. Each of the tracks includes a synchronization pattern 150 (i.e., sync data 1, sync data 2, sync data 3, sync data 4, sync data 5) followed by bit periods of user data 155, 160, 165, 170, 175, 180, 185, 190. The bit periods each include magnetic information corresponding to data for a given bit period. As the density of the bit periods increase, magnetic information from one bit period will interfere or be combined with magnetic information from surrounding bit periods. This includes interaction from bit periods in one track with bit periods in prior and subsequent tracks. Failure to properly account for inter-track interference results in diminished accuracy of read back data.

FIG. 1c shows alignment of a single head reader including a head HD1 flying over a track 111 on a storage medium. As shown, track 111 includes a sync data region 106 followed by a header data region 107. Header data region 107 is followed by a user data region 109. Similar to conventional art, each of the user data regions includes a preamble and header data. The preambles may alternate between tracks to allow for easy discernment of the tracks. FIG. 1d shows alignment of a multi-head reader including a leading head HD2 and a lagging head HD1 flying over track 111 on a storage medium. As shown, track 111 includes a sync data region 106 followed by a header data region 107. Leading head HD2 leads lagging head HD1 by a lateral displacement 186, and is separated from lagging head HD1 by a vertical displacement 182.

Figure 2:
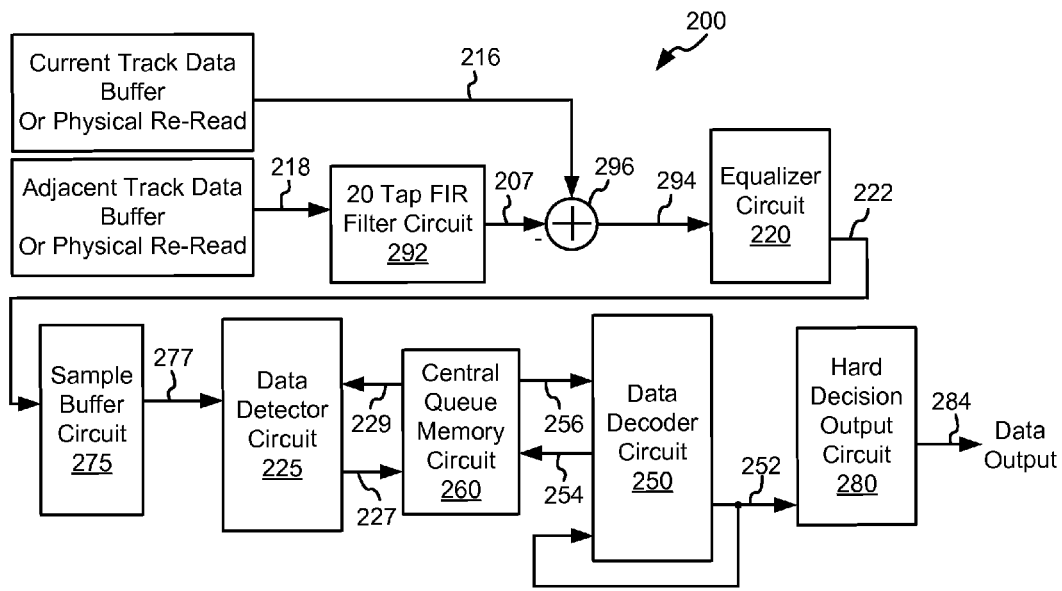
FIG. 2 shows a data processing circuit including x-sample inter-track interference mitigation circuitry in accordance with some embodiments of the present invention.

Turning to FIG. 2, a data processing circuit 200 including x-sample inter-track interference mitigation circuitry is shown in accordance with some embodiments of the present invention. Data processing circuit 200 processes x-samples 216 derived from a track currently being accessed and processed. X-samples 216 may be derived from physical reading of the current track of a storage medium (not shown). In some cases the physical reading may include sensing information from the current track by flying a read/write head assembly (not shown) that is disposed in relation to a storage medium (not shown). The resulting sensed signal is processed by an analog front end circuit (not shown) that may, for example, apply amplification and/or filtering in the analog signal domain to yield a processed analog signal. Based upon the disclosure provided herein, one of ordinary skill in the art will recognize a variety of circuitry that may be included as part of the analog front end circuit. The processed analog signal is then provided to an analog to digital converter circuit (not shown) where it is converted into a corresponding series of digital samples which are referred to herein as x-samples 216. The analog to digital converter circuit may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. In other cases, x-samples 216 are accessed from a data buffer (not shown) to which they were previously stored.

The x-sample inter-track interference mitigation circuitry includes a filter circuit 292 and a summation circuit 296. Filter circuit 292 applies a filtering algorithm to data 218 derived from a track on a storage medium adjacent to the track currently being accessed and processed. Data 218 may be either x-sample data or y-sample data. Referring to FIG. 1b as an example, the current track may be track 110 and the adjacent track may be track 105. As used herein, the phrase "x-sample data" is used in its broadest sense to mean a data set derived from the output of an analog to digital converter circuit prior to application of an equalization algorithm by an equalizer circuit. As used herein, the phrase "y-sample data" is used in its broadest sense to mean an equalized data set provided by an equalizer circuit. Where data 218 is x-sample data and is derived from a re-read of the adjacent track of the storage medium, data 218 is taken as the output of an analog to digital converter circuit. Alternatively, where data 218 is y-sample data and is derived from a re-read of the adjacent track of the storage medium, data 218 is taken as the output of an equalizer circuit. In other cases where data 218 is x-sample data and is derived from an adjacent track data buffer, data 218 is the buffered output of the analog to digital converter circuit during a read of the adjacent track that occurred prior to processing data from the current track. Alternatively, where data 218 is y-sample data and is derived from the adjacent track data buffer, data 218 is the buffered output of an equalizer circuit (i.e., equalized output 222 from an equalizer circuit 220) during a read of the adjacent track that occurred prior to processing data from the current track. The filtering algorithm applied by filter circuit 292 generates a series of estimated inter-track interference values 207 corresponding to respective x-sample values from the current track. Again, the series of estimated inter-track interference values 207 corresponding to respective x-sample values from the current track may be generated from either x-sample data or y-sample data from an adjacent track presented to filter circuit 292 as data 218.

In some embodiments, filter circuit 292 is a twenty (20) tap finite impulse response (FIR) filter. Where such a FIR filter is used, the data from the adjacent track is convolved to yield inter-track interference values 207. In such a case, filter circuit 292 generates estimated inter-track interference values 207 in accordance with the following equation:

$$\text{Estimated Inter Track Interference Values } 207 = \sum_{i=-M}^{N} \text{Data } 218_i \eta_i,$$

where η are the filter taps for filter circuit 292 and are adapted to minimize the squared error in accordance with the following equation:

$$\min \Sigma(\text{x samples}_i 216 - \text{x samples ideal}_i - \text{Estimated Inter Track Interference Values}_i 207)^2,$$

where x samples ideal$_i$ is computed by convolving a binary sequence derived from the current track and an estimation of the channel response. Based upon the disclosure provided herein, one of ordinary skill in the art will recognize other filters that may be used in relation to different embodiments of the present invention to generate inter-track interference values 207.

Summation circuit 296 subtracts estimated inter-track interference values 207 from x-samples 216 to yield corrected samples 294. Corrected samples 294 are provided to equalizer circuit 220 which applies an equalization algorithm to yield equalized output 222. In some embodiments, equalizer circuit 220 is a finite impulse response circuit. In such cases, the following equation describes the operation of equalizer 220:

$$\text{Equalized Output } 222 = \sum_{i=-M}^{N} \text{Corrected Samples}_i 294_i f_i,$$

where f are the filter taps for equalizer circuit 220 and are adapted to minimize the squared error remaining after equalization. Of note, it inter-track interference cancellation is instead applied after equalization and taps f are the same as the equalizer taps discussed in the preceding paragraph, then the order of the inter-track interference cancellation and the equalizer will not impact performance. However, in the present inventions where inter-track interference is canceled prior to application of the equalization algorithm by equalizer circuit 220, taps f can be better adapted using the cleaner input signal (i.e., corrected samples 294).

Equalized output 222 is provided to a sample buffer circuit 275 where it is initially provided as buffered data 277. Buffered data 277 from sample buffer circuit 275 is provided to a data detector circuit 225. In some cases data detector circuit 225 includes a primary data detector circuit and a secondary data detector circuit. In such a case, equalized output 222 may be provided directly to the secondary data detector circuit skipping sample buffer circuit 275. Sample buffer circuit 275 stores equalized output 222 as buffered data 277 for use in subsequent iterations through data detector circuit 225. Data detector circuit 225 may be any data detector circuit known in the art that is capable of producing a detected output 227. As some examples, data detector circuit 225 may be, but is not limited to, a Viterbi algorithm detector circuit or a maximum a posteriori detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. Detected output 227 may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 227 is provided to a central queue memory circuit 260 that operates to buffer data passed between data detector circuit 225 and data decoder circuit 250. In some cases, central queue memory circuit 260 includes interleaving (i.e., data shuffling) and de-interleaving (i.e., data un-shuffling) circuitry known in the art. When data decoder circuit 250 is available, data decoder circuit 250 accesses detected output 227 from central queue memory circuit 260 as a decoder input 256. Data decoder circuit 250 applies a data decoding algorithm to decoder input 156 in an attempt to recover originally written data. The result of the data decoding algorithm is provided as a decoded output 252. Similar to detected output 227, decoded output 252 may include both hard decisions and soft decisions. For example, data decoder circuit 250 may be any data decoder circuit known in the art that is capable of applying a decoding algorithm to a received input. Data decoder circuit 250 may be, but is not limited to, a low density parity check (LDPC) decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs (e.g., if sample buffer circuit 275 is close to getting filled up), decoded output 252 is stored to a memory included in a hard decision output circuit 280. In turn, hard decision output circuit 280 provides the converged decoded output 252 as a data output 284 to a recipient (not shown). The recipient may be, for example, an interface circuit operable to receive processed data sets. Based upon the disclosure provided herein, one of ordinary skill in the art will recognize a variety of recipients that may be used in relation to different embodiments of the present invention. Where the original data is not recovered (i.e., the data decoding algorithm failed to converge) prior to a timeout condition, decoded output 252 indicates that the data is unusable as is more specifically discussed below, and data output 284 is similarly identified as unusable.

One or more iterations through the combination of data detector circuit 225 and data decoder circuit 250 may be made in an effort to converge on the originally written data set. Processing through both the data detector circuit and the data decoder circuit is referred to as a "global iteration". For the first global iteration, data detector circuit 225 applies the data detection algorithm to equalized output 222 received as buffered data 277 without guidance from a decoded output. For subsequent global iterations, data detector circuit 225 applies the data detection algorithm to buffered data 277 as guided by decoded output 252. For the second and later global iterations, buffered data 277 may be overwritten by corrected data 242 or may remain equalized data 222 depending upon whether inter-track interference cancellation is performed during both standard processing (i.e., online processing) and retry processing (i.e., offline processing) as more fully described below. To facilitate this guidance, decoded output 252 is stored to central queue memory circuit 260 as a decoder output 254, and is provided from central queue memory circuit 260 as a detector input 229 when buffered data 277 is being re-processed through data detector circuit 225.

During each global iteration it is possible for data decoder circuit 250 to make one or more "local iterations" including application of the data decoding algorithm to decoder input 256. For the first local iteration, data decoder circuit 250 applies the data decoder algorithm without guidance from decoded output 252. For subsequent local iterations, data decoder circuit 250 applies the data decoding algorithm to decoder input 256 as guided by a previous decoded output 252. The number of local iterations allowed may be, for example, ten. Based upon the disclosure provided herein, one of ordinary skill in the art will recognize a variety of different numbers of local iterations that may be allowed in accordance with different embodiments of the present invention. Where the number of local iterations through data decoder circuit 250 exceeds that allowed, but it is determined that at least one additional global iteration during standard processing of the data set is allowed, decoded output 252 is provided back to central queue memory circuit 260 as decoded output 254. Decoded output 254 is maintained in central queue memory circuit 260 until data detector circuit 225 becomes available to perform additional processing.

In contrast, where the number of local iterations through data decoder circuit 250 exceeds that allowed and it is determined that the allowable number of global iterations has been surpassed for the data set and/or a timeout or memory usage calls for termination of processing of the particular data set, standard processing of the data set concludes and an error is indicated. In some cases, retry processing or some offline processing may be applied to recover the otherwise unconverged data set. Based upon the disclosure provided herein, one of ordinary skill in the art will recognize a variety of non-standard processing techniques that may be applied to recover the otherwise unrecoverable data set.

Figure 3:
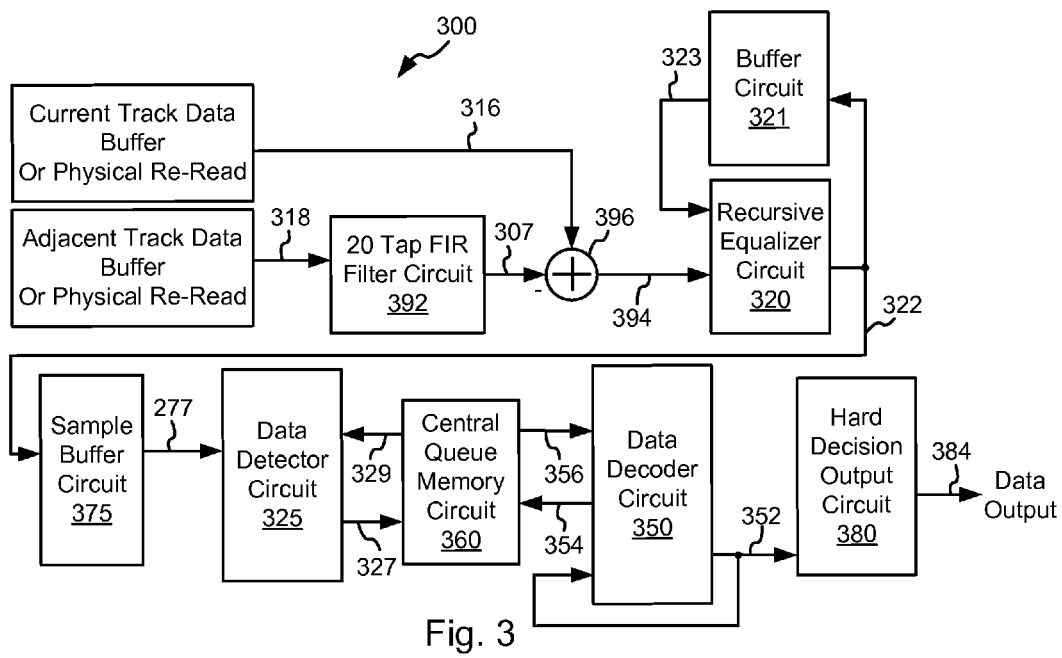
FIG. 3 shows another data processing circuit including x-sample inter-track interference mitigation circuitry in accordance with some embodiments of the present invention.

Turning to FIG. 3, another data processing circuit 300 including x-sample inter-track interference mitigation circuitry is shown in accordance with other embodiments of the present invention. Data processing circuit 300 processes x-samples 316 derived from a track currently being accessed and processed. X-samples 316 may be derived from physical reading of the current track of a storage medium (not shown). In some cases the physical reading may include sensing information from the current track by flying a read/write head assembly (not shown) that is disposed in relation to a storage medium (not shown). The resulting sensed signal is processed by an analog front end circuit (not shown) that may, for example, apply amplification and/or filtering in the analog signal domain to yield a processed analog signal. Based upon the disclosure provided herein, one of ordinary skill in the art will recognize a variety of circuitry that may be included as part of the analog front end circuit. The processed analog signal is then provided to an analog to digital converter circuit (not shown) where it is converted into a corresponding series of digital samples which are referred to herein as x-samples 316. The analog to digital converter circuit may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. In other cases, x-samples 316 are accessed from a data buffer (not shown) to which they were previously stored.

The x-sample inter-track interference mitigation circuitry includes a filter circuit 392 and a summation circuit 396. Filter circuit 392 applies a filtering algorithm to data 318 derived from a track on a storage medium adjacent to the track currently being accessed and processed. Data 318 may be either x-sample data or y-sample data. Referring to FIG. 1b as an example, the current track may be track 110 and the adjacent track may be track 105. Again, the phrase "x-sample data" is used in its broadest sense to mean a data set derived from the output of an analog to digital converter circuit prior to application of an equalization algorithm by an equalizer circuit, and the phrase "y-sample data" is used in its broadest sense to mean an equalized data set provided by an equalizer circuit. Where data 318 is x-sample data and is derived from a re-read of the adjacent track of the storage medium, data 318 is taken as the output of an analog to digital converter circuit. Alternatively, where data 318 is y-sample data and is derived from a re-read of the adjacent track of the storage medium, data 318 is taken as the output of an equalizer circuit. In other cases where data 318 is x-sample data and is derived from an adjacent track data buffer, data 318 is the buffered output of the analog to digital converter circuit during a read of the adjacent track that occurred prior to processing data from the current track. Alternatively, where data 318 is y-sample data and is derived from the adjacent track data buffer, data 318 is the buffered output of an equalizer circuit (i.e., equalized output 322 from a recursive equalizer circuit 320) during a read of the adjacent track that occurred prior to processing data from the current track. The filtering algorithm applied by filter circuit 392 generates a series of estimated inter-track interference values 307 corresponding to respective x-sample values from the current track. Again, the series of estimated inter-track interference values 307 corresponding to respective x-sample values from the current track may be generated from either x-sample data or y-sample data from an adjacent track presented to filter circuit 392 as data 318.

In some embodiments, filter circuit 392 is a twenty (20) tap finite impulse response (FIR) filter. Where such a FIR filter is used, the data from the adjacent track is convolved to yield estimated inter-track interference values 307. In such a case, filter circuit 392 generates estimated inter-track interference values 307 in accordance with the following equation:

$$\text{Estimated Inter Track Interference Values 307} = \sum_{i=-M}^{N} \text{Data } 318_i \eta_i,$$

where η are the filter taps for filter circuit 392 and are adapted to minimize the squared error in accordance with the following equation:

$$\min \Sigma(\text{x samples}_i 316 - \text{x samples ideal}_i - \text{Estimated Inter Track Interference Values}_i 307)^2,$$

where x samples ideal$_i$ is computed by convolving a binary sequence derived from the current track and an estimation of the channel response. Based upon the disclosure provided herein, one of ordinary skill in the art will recognize other filters that may be used in relation to different embodiments of the present invention to generate estimated inter-track interference values 307.

Summation circuit 396 subtracts estimated inter-track interference values 307 from x-samples 316 to yield corrected samples 394. Corrected samples 394 are provided to recursive equalizer circuit 320 which applies an equalization algorithm to yield equalized output 322. Equalized output 322 is provided to a buffer circuit 321 where it is stored for use in relation to the next equalization applied to the re-read version of the same data from the current track. In particular, a previous equalized output 323 is provided from buffer circuit 321 to recursive equalizer circuit 320. Recursive equalizer circuit 320 re-equalizes the combination of corrected samples 394 from the next read and the previous equalized output 323 existing at the end of the previous read. This process may be completed for a predetermined number of re-reads of data from the same track.

In addition, equalized output 322 is provided to a sample buffer circuit 375 where it is initially provided as buffered data 377. Buffered data 377 from sample buffer circuit 375 is provided to a data detector circuit 325. In some cases data detector circuit 325 includes a primary data detector circuit and a secondary data detector circuit. In such a case, equalized output 322 may be provided directly to the secondary data detector circuit skipping sample buffer circuit 375. Sample buffer circuit 375 stores equalized output 322 as buffered data 377 for use in subsequent iterations through data detector circuit 325. Data detector circuit 325 may be any data detector circuit known in the art that is capable of producing a detected output 327. As some examples, data detector circuit 325 may be, but is not limited to, a Viterbi algorithm detector circuit or a maximum a posteriori detector circuit as are known in the art. Again, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. Detected output 327 may include both hard decisions and soft decisions. Again, the terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 327 is provided to a central queue memory circuit 360 that operates to buffer data passed between data detector circuit 325 and data decoder circuit 350. In some cases, central queue memory circuit 360 includes interleaving (i.e., data shuffling) and de-interleaving (i.e., data un-shuffling) circuitry known in the art. When data decoder circuit 350 is available, data decoder circuit 350 accesses detected output 327 from central queue memory circuit 360 as a decoder input 356. Data decoder circuit 350 applies a data decoding algorithm to decoder input 156 in an attempt to recover originally written data. The result of the data decoding algorithm is provided as a decoded output 352. Similar to detected output 327, decoded output 352 may include both hard decisions and soft decisions. For example, data decoder circuit 350 may be any data decoder circuit known in the art that is capable of applying a decoding algorithm to a received input. Data decoder circuit 350 may be, but is not limited to, a low density parity check (LDPC) decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs (e.g., if sample buffer circuit 375 is close to getting filled up), decoded output 352 is stored to a memory included in a hard decision output circuit 380. In turn, hard decision output circuit 380 provides the converged decoded output 352 as a data output 384 to a recipient (not shown). The recipient may be, for example, an interface circuit operable to receive processed data sets. Based upon the disclosure provided herein, one of ordinary skill in the art will recognize a variety of recipients that may be used in relation to different embodiments of the present invention. Where the original data is not recovered (i.e., the data decoding algorithm failed to converge) prior to a timeout condition, decoded output 352 indicates that the data is unusable as is more specifically discussed below, and data output 384 is similarly identified as unusable.

One or more iterations through the combination of data detector circuit 325 and data decoder circuit 350 may be made in an effort to converge on the originally written data set. As mentioned above, processing through both the data detector circuit and the data decoder circuit is referred to as a "global iteration". For the first global iteration, data detector circuit 325 applies the data detection algorithm to equalized output 322 received as buffered data 377 without guidance from a decoded output. For subsequent global iterations, data detector circuit 325 applies the data detection algorithm to buffered data 377 as guided by decoded output 352. For the second and later global iterations, buffered data 377 may be overwritten by corrected data 342 or may remain equalized data 322 depending upon whether inter-track interference cancellation is performed during both standard processing (i.e., online processing) and retry processing (i.e., offline processing) as more fully described below. To facilitate this guidance, decoded output 352 is stored to central queue memory circuit 360 as a decoder output 354, and is provided from central queue memory circuit 360 as a detector input 329 when buffered data 377 is being reprocessed through data detector circuit 325.

During each global iteration it is possible for data decoder circuit 350 to make one or more local iterations including application of the data decoding algorithm to decoder input 356. For the first local iteration, data decoder circuit 350 applies the data decoder algorithm without guidance from decoded output 352. For subsequent local iterations, data decoder circuit 350 applies the data decoding algorithm to decoder input 356 as guided by a previous decoded output 352. The number of local iterations allowed may be, for example, ten. Based upon the disclosure provided herein, one of ordinary skill in the art will recognize a variety of different numbers of local iterations that may be allowed in accordance with different embodiments of the present invention. Where the number of local iterations through data decoder circuit 350 exceeds that allowed, but it is determined that at least one additional global iteration during standard processing of the data set is allowed, decoded output 352 is provided back to central queue memory circuit 360 as decoded output 354. Decoded output 354 is maintained in central queue memory circuit 360 until data detector circuit 325 becomes available to perform additional processing.

In contrast, where the number of local iterations through data decoder circuit 350 exceeds that allowed and it is determined that the allowable number of global iterations has been surpassed for the data set and/or a timeout or memory usage calls for termination of processing of the particular data set, standard processing of the data set concludes and an error is indicated. In some cases, retry processing or some offline processing may be applied to recover the otherwise unconverged data set. Based upon the disclosure provided herein, one of ordinary skill in the art will recognize a variety of non-standard processing techniques that may be applied to recover the otherwise unrecoverable data set.

Figure 4:
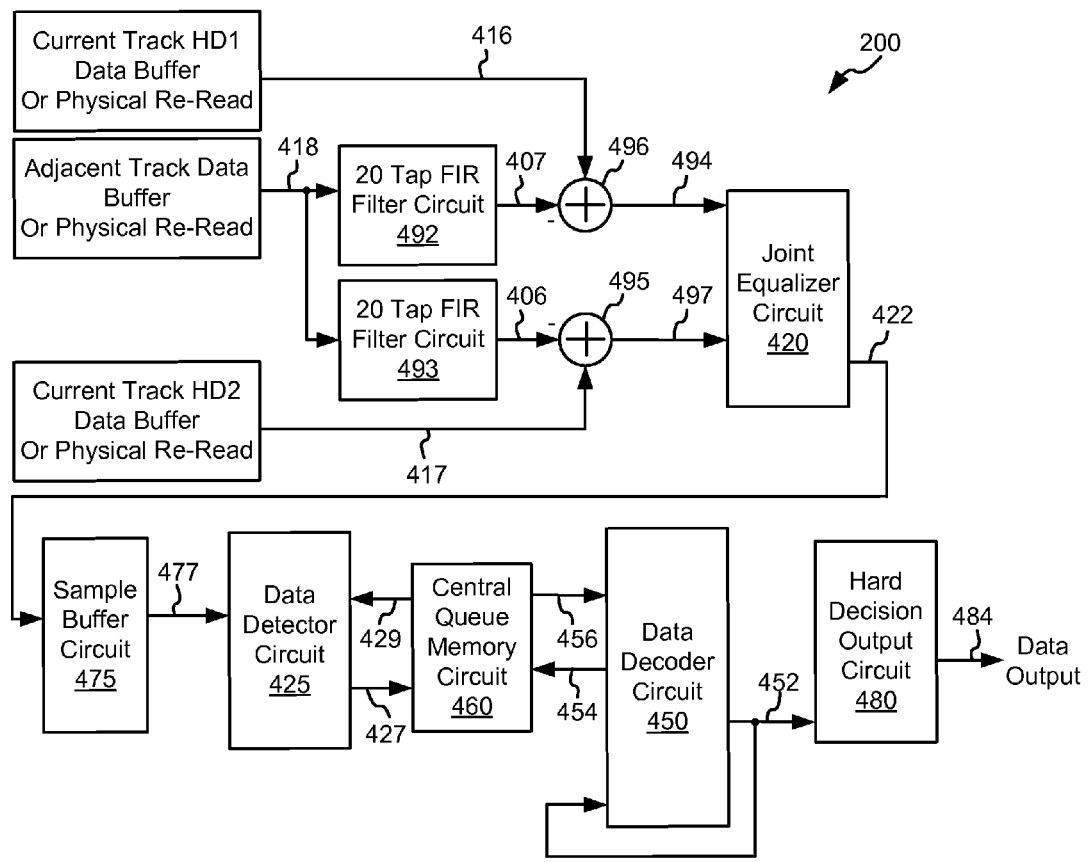
FIG. 4 shows a data processing circuit including x-sample inter-track interference mitigation circuitry used in relation to a multi-head reader in accordance with some embodiments of the present invention.

Turning to FIG. 4, a data processing circuit 400 includes x-sample inter-track interference mitigation circuitry used in relation to a multi-head reader is shown in accordance with some embodiments of the present invention. Data processing circuit 400 processes x-samples 416 and x-samples 417 derived from respective read heads (not shown) flying over the same track currently being accessed and processed. Both x-samples 416 and x-samples 417 may be derived from physical reading of the current track of a storage medium (not shown). In some cases the physical reading may include sensing information from the current track by flying a read/write head assembly (not shown) including the two read heads that is disposed in relation to a storage medium (not shown). The resulting sensed signals are independently processed by two separate combinations of an analog front end circuit and analog to digital converter circuit that each yield a corresponding series of digital samples which each corresponds to a respective ones of x-samples 416 and x-samples 417.

The x-sample inter-track interference mitigation circuitry includes two combinations of a filter circuit and summation circuit (i.e., a filter circuit 492 and a summation circuit 496, and a filter circuit 493 and a summation circuit 497). Filter circuit 492 and filter circuit 493 each apply a filtering algorithm to data 418 derived from a track on a storage medium adjacent to the track currently being accessed and processed. Data 418 may be either x-sample data (from the head closest to the current track when traversing the adjacent track) or y-sample data (derived from a combination of the data from both heads). Referring to FIG. 1b as an example, the current track may be track 110 and the adjacent track may be track 105. Again, the phrase "x-sample data" is used in its broadest sense to mean a data set derived from the output of an analog to digital converter circuit prior to application of an equalization algorithm by an equalizer circuit, and the phrase "y-sample data" is used in its broadest sense to mean an equalized data set provided by an equalizer circuit. Where data 418 is x-sample data and is derived from a re-read of the adjacent track of the storage medium, data 418 is taken as the output of an analog to digital converter circuit. Alternatively, where data 418 is y-sample data and is derived from a re-read of the adjacent track of the storage medium, data 418 is taken as the output of an equalizer circuit. In other cases where data 418 is x-sample data and is derived from an adjacent track data buffer, data 418 is the buffered output of an analog to digital converter circuit during a read of the adjacent track that occurred prior to processing data from the current track. Alternatively, where data 418 is y-sample data and is derived from the adjacent track data buffer, data 418 is the buffered output of an equalizer circuit (i.e., equalized output 422 from an equalizer circuit 420) during a read of the adjacent track that occurred prior to processing data from the current track. The filtering algorithm applied by filter circuit 492 generates a series of estimated inter-track interference values 407 corresponding to respective x-sample values from a first head (HD1) from the current track, and the filtering algorithm applied by filter circuit 493 generates a series of estimated inter-track interference values 406 corresponding to respective x-sample values from a second head (HD2) from the current track. Again, the series of estimated inter-track interference values 407 corresponding to respective x-sample values from the current track may be generated from either x-sample data or y-sample data from an adjacent track presented to filter circuit 492 as data 418, and the series of estimated inter-track interference values 406 corresponding to respective x-sample values from the current track may be generated from either x-sample data or y-sample data from an adjacent track presented to filter circuit 493 as data 417.

In some embodiments, filter circuit 492 is a twenty (20) tap finite impulse response (FIR) filter. Where such a FIR filter is used, the data from the adjacent track is convolved to yield estimated inter-track interference values 407. In such a case, filter circuit 492 generates estimated inter-track interference values 407 in accordance with the following equation:

$$\text{Estimated Inter Track Interference Values } 407 = \sum_{i=-M}^{N} \text{Data } 218_i \eta(1)_i,$$

where η(1) are the filter taps for filter circuit 492 and are adapted to minimize the squared error in accordance with the following equation:

$$\min \Sigma(\text{x samples}_i 416 - \text{x samples ideal}_i - \text{Estimated Inter Track Interference Values}_i 407)^2,$$

where x samples ideal(1)$_i$ is computed by convolving a binary sequence derived from the first head (HD1) of the current track and an estimation of the channel response. Based upon the disclosure provided herein, one of ordinary skill in the art will recognize other filters that may be used in relation to different embodiments of the present invention to generate estimated inter-track interference values 407.

Similarly, filter circuit 493 may be a twenty (20) tap finite impulse response (FIR) filter. Where such a FIR filter is used, the data from the adjacent track is convolved to yield estimated inter-track interference values 406. In such a case, filter circuit 493 generates estimated inter-track interference values 406 in accordance with the following equation:

$$\text{Estimated Inter Track Interference Values } 406 = \sum_{i=-M}^{N} \text{Data } 418_i \eta(2)_i,$$

where η(2) are the filter taps for filter circuit 493 and are adapted to minimize the squared error in accordance with the following equation:

$$\min \Sigma(\text{x samples}_i 417 - \text{x samples ideal}_i - \text{Estimated Inter Track Interference Values}_i 406)^2,$$

where x samples ideal(2), is computed by convolving a binary sequence derived from the second head (HD2) of the current track and an estimation of the channel response. Based upon the disclosure provided herein, one of ordinary skill in the art will recognize other filters that may be used in relation to different embodiments of the present invention to generate estimated inter-track interference values 406. Of note, η(2) is different from η(1) because the distance of the first head (HD1) from the adjacent track is different from the distance of the second head (HD2) from the adjacent track.

Summation circuit 496 subtracts estimated inter-track interference values 407 from x-samples 416 to yield corrected samples 494. Similarly, summation circuit 495 subtracts estimated inter-track interference values 406 from x-samples 417 to yield corrected samples 497. Corrected samples 494 and corrected samples 497 are provided to joint equalizer circuit 420 which applies a joint equalization algorithm to yield equalized output 422. In some embodiments, joint equalizer circuit 420 is implemented similar to that discussed in U.S. patent application Ser. No. 14/148,306 entitled "Systems and Methods for Multi-Head Balancing in a Storage Device", and filed Jan. 6, 2014 by Pan et al. The entirety of the aforementioned reference is incorporated herein for all purposes.

Equalized output 422 is provided to a sample buffer circuit 475 where it is initially provided as buffered data 477. Buffered data 477 from sample buffer circuit 475 is provided to a data detector circuit 425. In some cases data detector circuit 425 includes a primary data detector circuit and a secondary data detector circuit. In such a case, equalized output 422 may be provided directly to the secondary data detector circuit skipping sample buffer circuit 475. Sample buffer circuit 475 stores equalized output 422 as buffered data 477 for use in subsequent iterations through data detector circuit 425. Data detector circuit 425 may be any data detector circuit known in the art that is capable of producing a detected output 427. As some examples, data detector circuit 425 may be, but is not limited to, a Viterbi algorithm detector circuit or a maximum a posteriori detector circuit as are known in the art. Again, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. Detected output 427 may include both hard decisions and soft decisions. Again, the terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 427 is provided to a central queue memory circuit 460 that operates to buffer data passed between data detector circuit 425 and data decoder circuit 450. In some cases, central queue memory circuit 460 includes interleaving (i.e., data shuffling) and de-interleaving (i.e., data un-shuffling) circuitry known in the art. When data decoder circuit 450 is available, data decoder circuit 450 accesses detected output 427 from central queue memory circuit 460 as a decoder input 456. Data decoder circuit 450 applies a data decoding algorithm to decoder input 156 in an attempt to recover originally written data. The result of the data decoding algorithm is provided as a decoded output 452. Similar to detected output 427, decoded output 452 may include both hard decisions and soft decisions. For example, data decoder circuit 450 may be any data decoder circuit known in the art that is capable of applying a decoding algorithm to a received input. Data decoder circuit 450 may be, but is not limited to, a low density parity check (LDPC) decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs (e.g., if sample buffer circuit 475 is close to getting filled up), decoded output 452 is stored to a memory included in a hard decision output circuit 480. In turn, hard decision output circuit 480 provides the converged decoded output 452 as a data output 484 to a recipient (not shown). The recipient may be, for example, an interface circuit operable to receive processed data sets. Based upon the disclosure provided herein, one of ordinary skill in the art will recognize a variety of recipients that may be used in relation to different embodiments of the present invention. Where the original data is not recovered (i.e., the data decoding algorithm failed to converge) prior to a timeout condition, decoded output 452 indicates that the data is unusable as is more specifically discussed below, and data output 484 is similarly identified as unusable.

One or more iterations through the combination of data detector circuit 425 and data decoder circuit 450 may be made in an effort to converge on the originally written data set. Processing through both the data detector circuit and the data decoder circuit is referred to as a "global iteration". For the first global iteration, data detector circuit 425 applies the data detection algorithm to equalized output 422 received as buffered data 477 without guidance from a decoded output. For subsequent global iterations, data detector circuit 425 applies the data detection algorithm to buffered data 477 as guided by decoded output 452. For the second and later global iterations, buffered data 477 may be overwritten by corrected data 442 or may remain equalized data 422 depending upon whether inter-track interference cancellation is performed during both standard processing (i.e., online processing) and retry processing (i.e., offline processing) as more fully described below. To facilitate this guidance, decoded output 452 is stored to central queue memory circuit 460 as a decoder output 454, and is provided from central queue memory circuit 460 as a detector input 429 when buffered data 477 is being re-processed through data detector circuit 425.

During each global iteration it is possible for data decoder circuit 450 to make one or more "local iterations" including application of the data decoding algorithm to decoder input 456. For the first local iteration, data decoder circuit 450 applies the data decoder algorithm without guidance from decoded output 452. For subsequent local iterations, data decoder circuit 450 applies the data decoding algorithm to decoder input 456 as guided by a previous decoded output 452. The number of local iterations allowed may be, for example, ten. Based upon the disclosure provided herein, one of ordinary skill in the art will recognize a variety of different numbers of local iterations that may be allowed in accordance with different embodiments of the present invention. Where the number of local iterations through data decoder circuit 450 exceeds that allowed, but it is determined that at least one additional global iteration during standard processing of the data set is allowed, decoded output 452 is provided back to central queue memory circuit 460 as decoded output 454. Decoded output 454 is maintained in central queue memory circuit 460 until data detector circuit 425 becomes available to perform additional processing.

In contrast, where the number of local iterations through data decoder circuit 450 exceeds that allowed and it is determined that the allowable number of global iterations has been surpassed for the data set and/or a timeout or memory usage calls for termination of processing of the particular data set, standard processing of the data set concludes and an error is indicated. In some cases, retry processing or some offline processing may be applied to recover the otherwise unconverged data set. Based upon the disclosure provided herein, one of ordinary skill in the art will recognize a variety of non-standard processing techniques that may be applied to recover the otherwise unrecoverable data set.

Figure 5A:
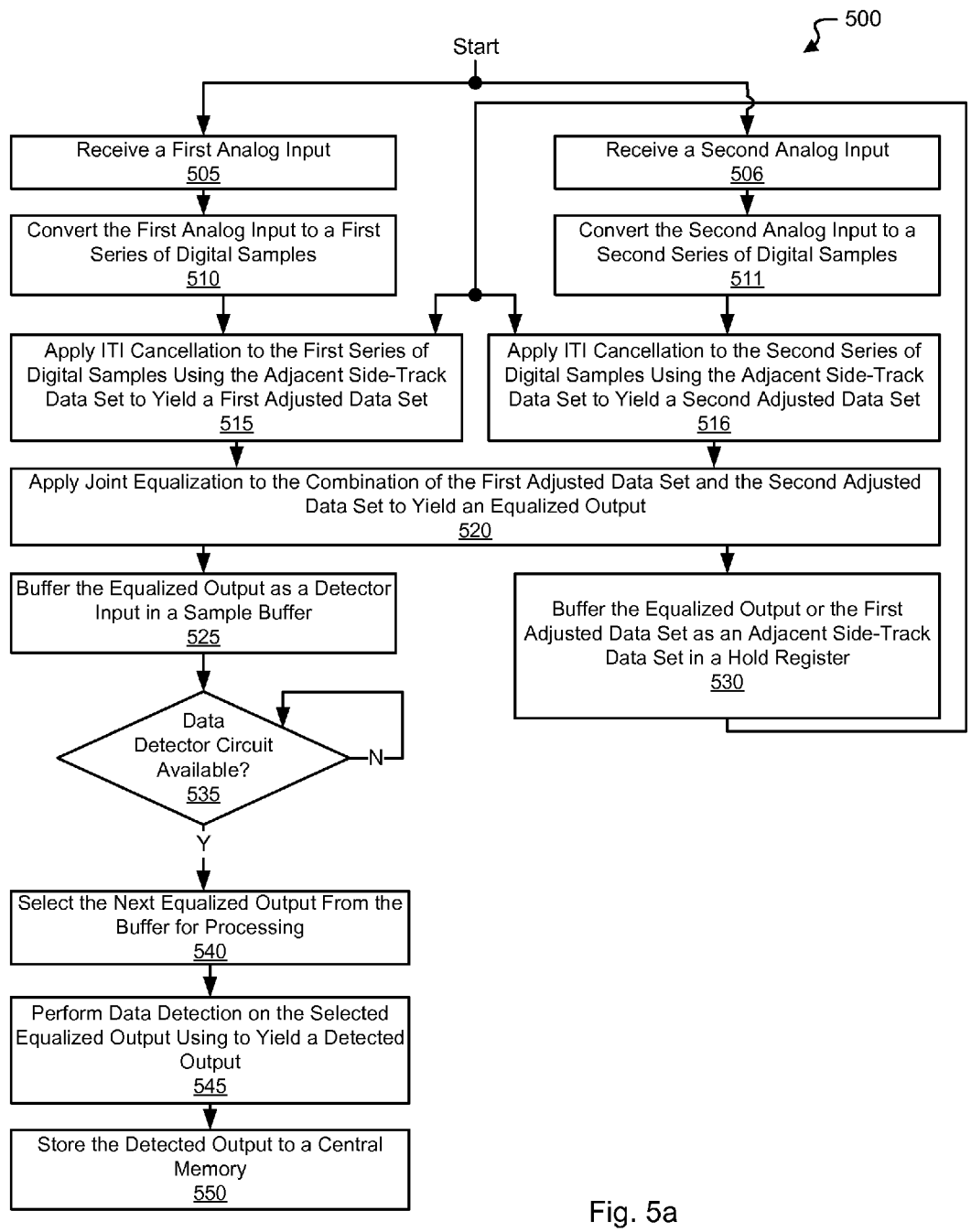
FIGS. 5a-5b are flow diagrams showing a method in accordance with various embodiments of the present invention for x-sample inter-track interference mitigation on data derived from a multi-head reader.
Figure 5B:
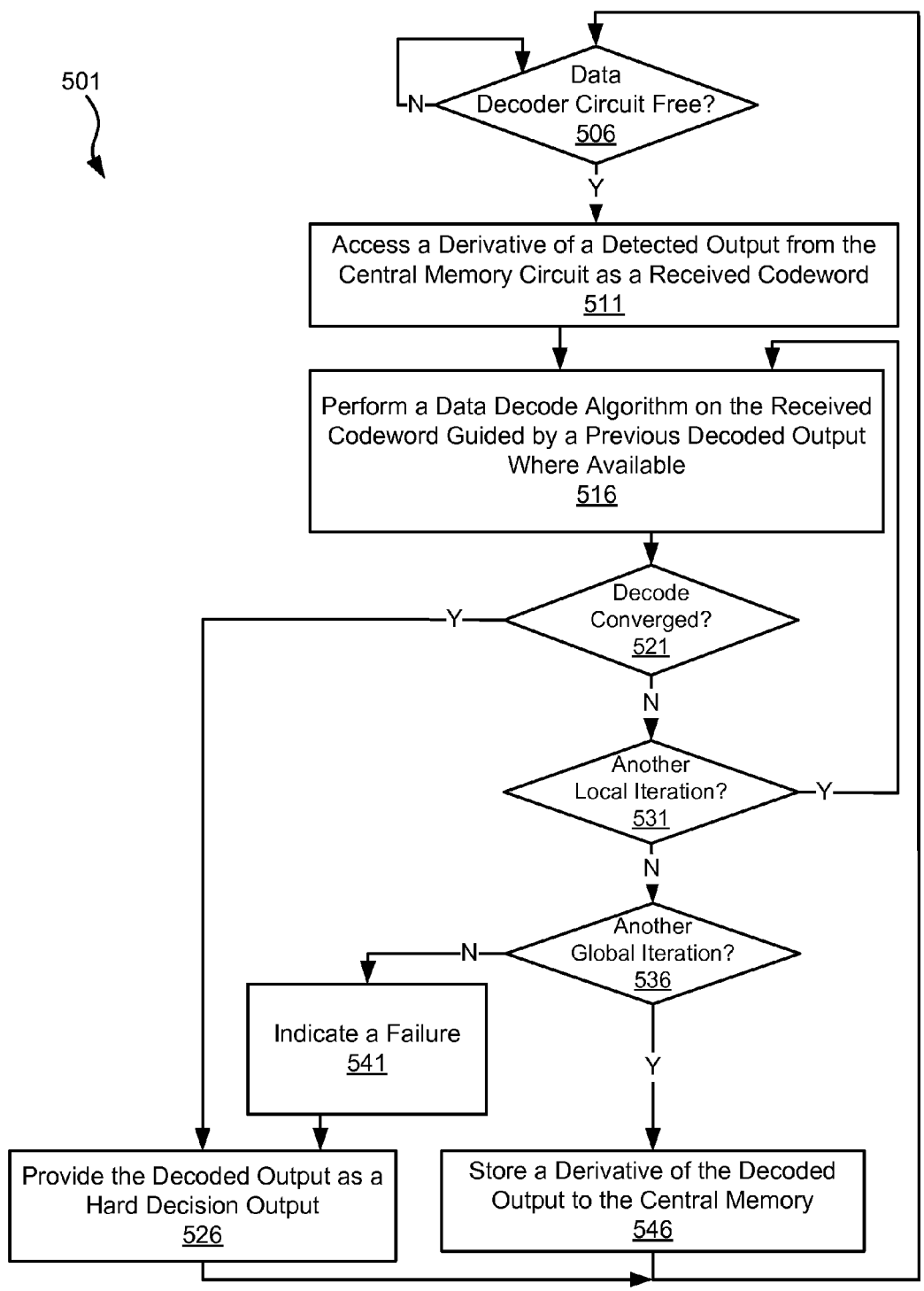

Turning to FIGS. 5a-5b, flow diagrams 500, 501 show a method in accordance with various embodiments of the present invention for x-sample inter-track interference mitigation on data derived from a multi-head reader. Following flow diagram 500 of FIG. 5a, a first analog input is received (block 505). The first analog input may be derived from, for example, a first read head (HD1) flying over a track of a storage medium. Based upon the disclosure provided herein, one of ordinary skill in the art will recognize a variety of sources of the first analog input. The first analog input is converted to a first series of digital samples (block 510). This conversion may be done using an analog to digital converter circuit or system as are known in the art. Of note, any circuit known in the art that is capable of converting an analog signal into a series of digital values representing the received analog signal may be used.

Inter-track interference cancellation is applied to the first series of digital samples using an adjacent side-track data set to yield a first adjusted data set (block 515). The adjacent side-track data set may be either x-samples or y-samples corresponding to a track adjacent to the currently processing data track. The adjacent side-track data set may be generated by re-reading the storage medium or may be stored during earlier processing of the adjacent side-track as the current track. In some embodiments, the inter-track interference cancellation is done using a twenty (20) tap finite impulse response (FIR) filter circuit and a summation circuit. Where such a FIR filter is used, the data from the adjacent track is convolved to yield inter-track interference values. In such a case, the FIR filter circuit generates the estimated inter-track interference values in accordance with the following equation:

$$\text{Estimated Track Interference Values} = \sum_{i=-M}^{N} \text{Adjacent Track Data}_i \eta(1)_i,$$

where $\eta$ are the filter taps for FIR filter circuit that are adapted to minimize the squared error in accordance with the following equation:

$$\min \Sigma (\text{x samples}_i - \text{x samples ideal}_i - \text{Estimated Inter Track Interference Values}_i)^2,$$

where x-samples are the first series of digital samples read during processing of the current track, and x samples ideal$_i$ is computed by convolving a binary sequence derived from the current track and an estimation of the channel response. Based upon the disclosure provided herein, one of ordinary skill in the art will recognize other filters that may be used in relation to different embodiments of the present invention to generate the inter-track interference values. The summation circuit subtracts the estimated inter-track interference values from the first series of digital samples to yield the first adjusted data set.

In parallel, a second analog input is received (block 506). The second analog input may be derived from, for example, a second read head (HD2) flying over the same track of a storage medium as the first read head. Based upon the disclosure provided herein, one of ordinary skill in the art will recognize a variety of sources of the second analog input. The second analog input is converted to a second series of digital samples (block 511). This conversion may be done using an analog to digital converter circuit or system as are known in the art. Of note, any circuit known in the art that is capable of converting an analog signal into a series of digital values representing the received analog signal may be used.

Inter-track interference cancellation is applied to the second series of digital samples using the adjacent side-track data set to yield a second adjusted data set (block 516). Again, the adjacent side-track data set may be either x-samples or y-samples corresponding to a track adjacent to the currently processing data track which may be generated by re-reading the storage medium or may be stored during earlier processing of the adjacent side-track as the current track. In some embodiments, the inter-track interference cancellation is done using a twenty (20) tap finite impulse response (FIR) filter circuit and a summation circuit. Where such a FIR filter is used, the data from the adjacent track is convolved to yield inter-track interference values. In such a case, the FIR filter circuit generates the estimated inter-track interference values in accordance with the following equation:

$$\text{Inter Track Interference Values} = \sum_{i=-M}^{N} \text{Adjacent Track Data}_i \eta(2)_i,$$

where $\eta(2)$ are the filter taps for FIR filter circuit that are adapted to minimize the squared error in accordance with the following equation:

$$\min \Sigma(\text{x samples}_i - \text{x samples ideal}_i - \text{Estimated Inter Track Interference Values}_i)^2,$$

where x-samples are the second series of digital samples read during processing of the current track, and x samples ideal$_i$ is computed by convolving a binary sequence derived from the current track and an estimation of the channel response. Of note, $\eta(2)$ is different from $\eta(1)$ because the distance of the first head (HD1) from the adjacent track is different from the distance of the second head (HD2) from the adjacent track. Based upon the disclosure provided herein, one of ordinary skill in the art will recognize other filters that may be used in relation to different embodiments of the present invention to generate the inter-track interference values. The summation circuit subtracts the estimated inter-track interference values from the second series of digital samples to yield the second adjusted data set.

Joint equalization is applied to the combination of the first adjusted data set and the second adjusted data set to yield an equalized output (block 520). In some embodiments, the joint equalization may be similar to that disclosed in U.S. patent application Ser. No. 14/148,306 entitled "Systems and Methods for Multi-Head Balancing in a Storage Device", and filed Jan. 6, 2014 by Pan et al. The entirety of the aforementioned reference was previously incorporated herein by reference for all purposes. Either the equalized output or the first adjusted data set (i.e., the adjusted data set from the head closest to the next track to be read) is stored as the adjacent side track data set in a hold register (block 530). This is the adjacent side track data used in blocks 515, 516 to apply the inter-track interference cancellation discussed above.

Additionally, the equalized output is stored as a detector input in a sample buffer (block 525). It is then determined whether a data detector circuit is available (block 535). Where the data detector circuit is available (block 535), the next equalized output from the sample buffer is selected for processing (block 540), and a data detection is performed on the selected equalized output to yield a detected output (block 545). The data detection may be, but is not limited to, a Viterbi algorithm data detection or a maximum a posteriori data detection. Based upon the disclosure provided herein, one of ordinary skill in the art will recognize other data detection algorithms that may be used in relation to different embodiments of the present invention. The detected output is then stored to a central memory where it awaits the availability of a downstream data decoder circuit (block 550).

Turning to FIG. 5b and following flow diagram 501, in parallel to the previously described data detection process, it is determined whether a data decoder circuit is available (block 506). The data decoder circuit may be, for example, a low density data decoder circuit as are known in the art. Where the data decoder circuit is available (block 506), a previously stored derivative of a detected output is accessed from the central memory and used as a received codeword (block 511). A data decode algorithm is applied to the received codeword to yield a decoded output (block 516). It is then determined whether the decoded output converged (e.g., resulted in the originally written data as indicated by the lack of remaining unsatisfied checks) (block 521). Where the decoded output converged (block 521), the converged codeword is provided as a decoded output (block 526).

Alternatively, where the decoded output failed to converge (e.g., errors remain) (block 521), it is determined whether another local iteration is desired (block 531). In some cases, as a default seven local iterations are allowed per each global iteration. Based upon the disclosure provided herein, one of ordinary skill in the art will recognize another default number of local iterations that may be used in relation to different embodiments of the present invention. Where another local iteration is desired (block 531), the data decode algorithm is re-applied using the current decoded output as a guide (block 516).

Alternatively, where another local iteration is not desired (block 531), it is determined whether another global iteration is allowed (block 536). As a default, another global iteration is allowed where there is sufficient available space in the central memory and an output memory reordering queue to allow another pass through processing the currently processing codeword. The amount of available space in the central memory and an output memory reordering queue is a function of how many iterations are being used by concurrently processing codewords to converge. For more detail on the output queue time limitation see, for example, U.S. Pat. No. 8,245,104 entitled "Systems and Methods for Queue Based Data Detection and Decoding", and filed May 8, 2008 by Yang et al. The entirety of the aforementioned reference is incorporated herein by reference for all purposes. Thus, the amount of time that a codeword may continue processing through global iterations is a function of the availability of central memory and an output memory reordering queue. By limiting the number of global iterations that may be performed, the amount of time a codeword may continue processing through global iterations can be reduced. Based upon the disclosure provided herein, one of ordinary skill in the art may recognize other basis for limiting the number of global iterations allowed.

Where another global iteration is allowed (block 536), a derivative of the decoded output is stored to the central memory (block 546). The process of data detection beginning at block 540 of FIG. 5a may then be re-applied to the decoded output. Alternatively, where another global iteration is not allowed (block 536), a failure to converge is indicated (block 541), and the current decoded output is provided (block 526).

Figure 6A:
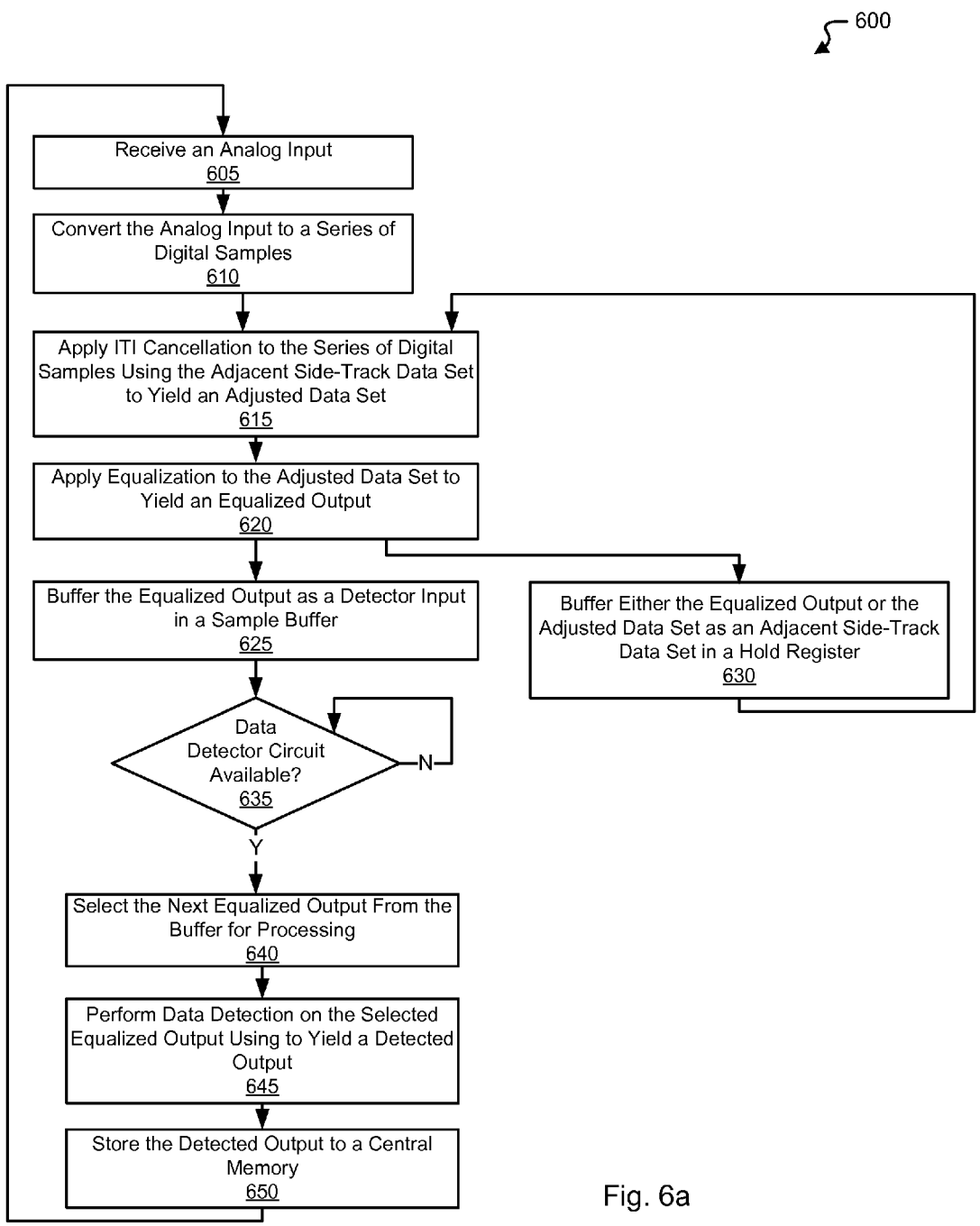
FIGS. 6a-6b are flow diagrams showing a method in accordance with various embodiments of the present invention for x-sample inter-track interference mitigation on data derived from a single head reader.
Figure 6B:
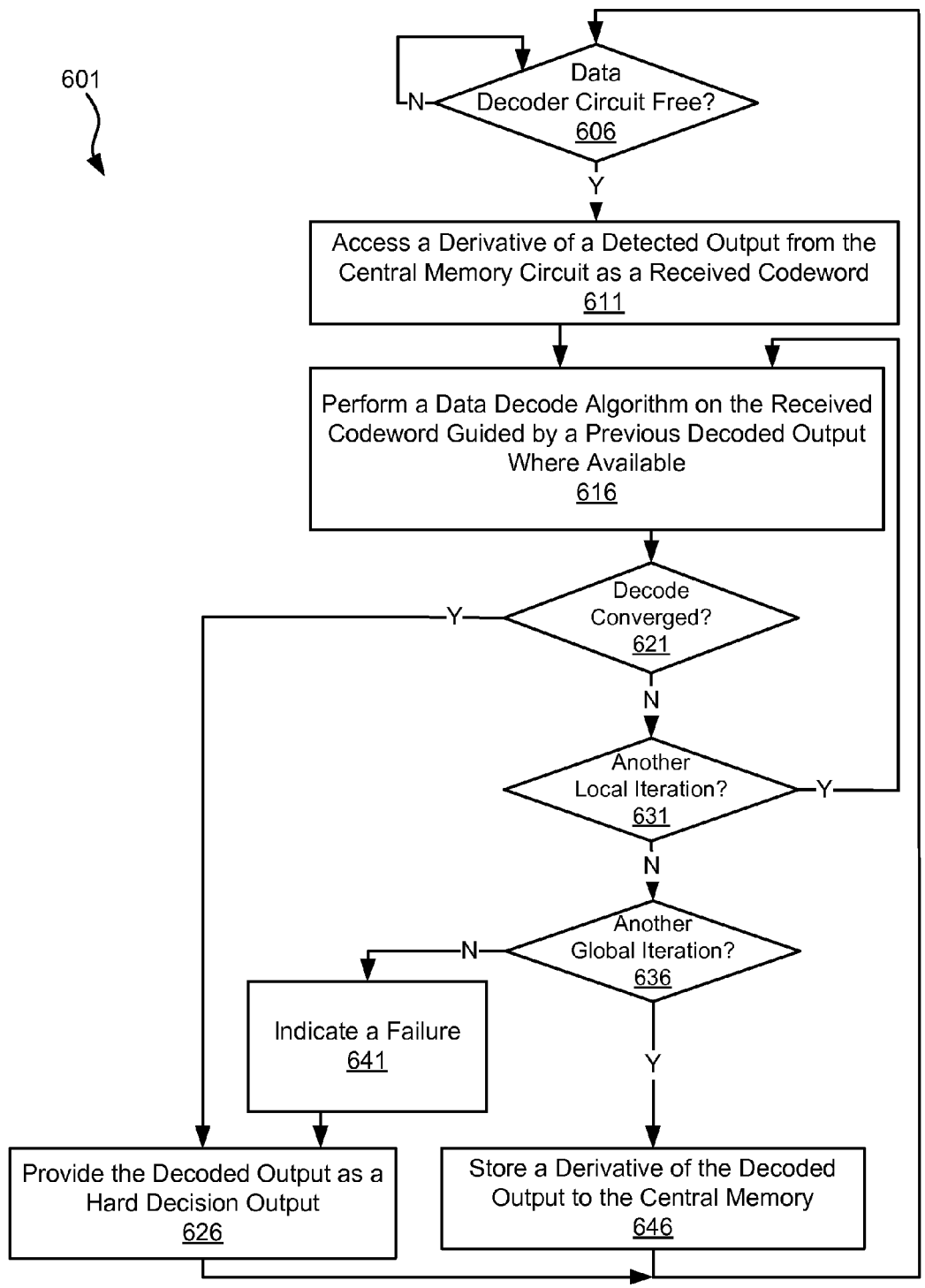

Turning to FIGS. 6a-6b, flow diagrams 600, 601 show a method in accordance with various embodiments of the present invention for x-sample inter-track interference mitigation on data derived from a single head reader. Following flow diagram 600 of FIG. 6a, an analog input is received (block 605). The analog input may be derived from, for example, a read head (HD1) flying over a track of a storage medium. Based upon the disclosure provided herein, one of ordinary skill in the art will recognize a variety of sources of the first analog input. The analog input is converted to a series of digital samples (block 510). This conversion may be done using an analog to digital converter circuit or system as are known in the art. Of note, any circuit known in the art that is capable of converting an analog signal into a series of digital values representing the received analog signal may be used.

Inter-track interference cancellation is applied to the series of digital samples using an adjacent side-track data set to yield an adjusted data set (block 615). The adjacent side-track data set may be either x-samples or y-samples corresponding to a track adjacent to the currently processing data track. The adjacent side-track data set may be generated by re-reading the storage medium or may be stored during earlier processing of the adjacent side-track as the current track. In some embodiments, the inter-track interference cancellation is done using a twenty (20) tap finite impulse response (FIR) filter circuit and a summation circuit. Where such a FIR filter is used, the data from the adjacent track is convolved to yield inter-track interference values. In such a case, the FIR filter circuit generates the inter-track interference values in accordance with the following equation:

$$\text{Inter Track Interference Values} = \sum_{i=-M}^{N} \text{Adjacent Track Data}_i \eta(1)_i,$$

where $\eta$ are the filter taps for FIR filter circuit that are adapted to minimize the squared error in accordance with the following equation:

$$\min \Sigma(x \text{ samples}_i - x \text{ samples ideal}_i - \text{Estimated Inter Track Interference Values}_i)^2,$$

where x-samples are the series of digital samples read during processing of the current track, and x samples ideal$_i$ is computed by convolving a binary sequence derived from the current track and an estimation of the channel response. Based upon the disclosure provided herein, one of ordinary skill in the art will recognize other filters that may be used in relation to different embodiments of the present invention to generate the inter-track interference values. The summation circuit subtracts the inter-track interference values from the first series of digital samples to yield the adjusted data set.

Equalization is applied to the combination of the first adjusted data set and the second adjusted data set to yield an equalized output (block 620). In some embodiments, the equalization is performed by a finite impulse response filter as is known in the art. Either the equalized output or the adjusted data set is stored as the adjacent side track data set in a hold register (block 630). This is the adjacent side track data used in block 615 to apply the inter-track interference cancellation discussed above.

Additionally, the equalized output is stored as a detector input in a sample buffer (block 625). It is then determined whether a data detector circuit is available (block 635). Where the data detector circuit is available (block 635), the next equalized output from the sample buffer is selected for processing (block 640), and a data detection is performed on the selected equalized output to yield a detected output (block 645). The data detection may be, but is not limited to, a Viterbi algorithm data detection or a maximum a posteriori data detection. Based upon the disclosure provided herein, one of ordinary skill in the art will recognize other data detection algorithms that may be used in relation to different embodiments of the present invention. The detected output is then stored to a central memory where it awaits the availability of a downstream data decoder circuit (block 650).

Turning to FIG. 6b and following flow diagram 601, in parallel to the previously described data detection process, it is determined whether a data decoder circuit is available (block 606). The data decoder circuit may be, for example, a low density data decoder circuit as are known in the art. Where the data decoder circuit is available (block 606), a previously stored derivative of a detected output is accessed from the central memory and used as a received codeword (block 611). A data decode algorithm is applied to the received codeword to yield a decoded output (block 616). It is then determined whether the decoded output converged (e.g., resulted in the originally written data as indicated by the lack of remaining unsatisfied checks) (block 621). Where the decoded output converged (block 621), the converged codeword is provided as a decoded output (block 626).

Alternatively, where the decoded output failed to converge (e.g., errors remain) (block 621), it is determined whether another local iteration is desired (block 631). In some cases, as a default seven local iterations are allowed per each global iteration. Based upon the disclosure provided herein, one of ordinary skill in the art will recognize another default number of local iterations that may be used in relation to different embodiments of the present invention. Where another local iteration is desired (block 631), the data decode algorithm is re-applied using the current decoded output as a guide (block 616).

Alternatively, where another local iteration is not desired (block 631), it is determined whether another global iteration is allowed (block 636). As a default, another global iteration is allowed where there is sufficient available space in the central memory and an output memory reordering queue to allow another pass through processing the currently processing codeword. The amount of available space in the central memory and an output memory reordering queue is a function of how many iterations are being used by concurrently processing codewords to converge. For more detail on the output queue time limitation see, for example, U.S. Pat. No. 8,245,104 entitled "Systems and Methods for Queue Based Data Detection and Decoding", and filed May 8, 2008 by Yang et al. The entirety of the aforementioned reference is incorporated herein by reference for all purposes. Thus, the amount of time that a codeword may continue processing through global iterations is a function of the availability of central memory and an output memory reordering queue. By limiting the number of global iterations that may be performed, the amount of time a codeword may continue processing through global iterations can be reduced. Based upon the disclosure provided herein, one of ordinary skill in the art may recognize other basis for limiting the number of global iterations allowed.

Where another global iteration is allowed (block 636), a derivative of the decoded output is stored to the central memory (block 646). The process of data detection beginning at block 640 of FIG. 6a may then be re-applied to the decoded output. Alternatively, where another global iteration is not allowed (block 636), a failure to converge is indicated (block 641), and the current decoded output is provided (block 626).

Figure 7:
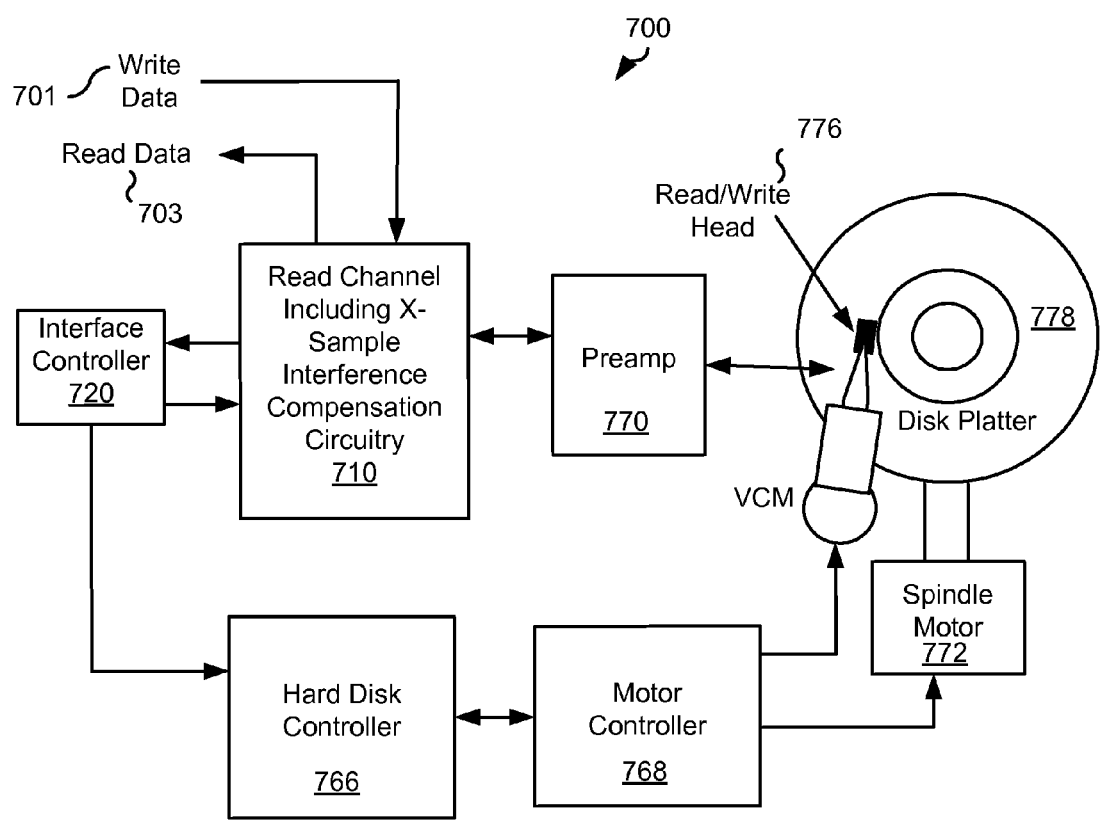
FIG. 7 shows a storage system with x-sample inter-track interference compensation circuitry in accordance with various embodiments of the present invention.

Turning to FIG. 7, a storage system 700 including a read channel circuit 710 having x-sample inter-track interference compensation circuitry is shown in accordance with various embodiments of the present invention. Storage system 700 may be, for example, a hard disk drive. Storage system 700 also includes a preamplifier 770, an interface controller 720, a hard disk controller 766, a motor controller 768, a spindle motor 772, a disk platter 778, and a read/write head assembly 776. Interface controller 720 controls addressing and timing of data to/from disk platter 778. The data on disk platter 778 consists of groups of magnetic signals that may be detected by read/write head assembly 776 when the assembly is properly positioned over disk platter 778. In one embodiment, disk platter 778 includes magnetic signals recorded in accordance with either a longitudinal or a perpendicular recording scheme.

In a typical read operation, read/write head assembly 776 is accurately positioned by motor controller 768 over a desired data track on disk platter 778. Motor controller 768 both positions read/write head assembly 776 in relation to disk platter 778 and drives spindle motor 772 by moving read/write head assembly to the proper data track on disk platter 778 under the direction of hard disk controller 766. Spindle motor 772 spins disk platter 778 at a determined spin rate (RPMs). Once read/write head assembly 778 is positioned adjacent the proper data track, magnetic signals representing data on disk platter 778 are sensed by read/write head assembly 776 as disk platter 778 is rotated by spindle motor 772. The sensed magnetic signals are provided as a continuous, minute analog signal representative of the magnetic data on disk platter 778. This minute analog signal is transferred from read/write head assembly 776 to read channel circuit 710 via preamplifier 770. Preamplifier 770 is operable to amplify the minute analog signals accessed from disk platter 778. In turn, read channel circuit 710 decodes and digitizes the received analog signal to recreate the information originally written to disk platter 778. This data is provided as read data 703 to a receiving circuit. A write operation is substantially the opposite of the preceding read operation with write data 701 being provided to read channel circuit 710. This data is then encoded and written to disk platter 778.

During a read operation, data is sensed from disk platter 778 and processed through a data processing circuit including a data detector circuit and a data decoder circuit. This data processing includes cancellation of inter-track interference in the x-samples. The x-sample inter-track interference cancellation may be done using circuitry similar to that discussed above in relation to FIGS. 2-4, and/or may use methods discussed above in relation to FIGS. 5a-5b or FIGS. 6a-6b.

It should be noted that storage system 700 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 700, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 710 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 700 may be modified to include solid state memory that is used to store data in addition to the storage offered by disk platter 778. This solid state memory may be used in parallel to disk platter 778 to provide additional storage. In such a case, the solid state memory receives and provides information directly to read channel circuit 710. Alternatively, the solid state memory may be used as a cache where it offers faster access time than that offered by disk platted 778. In such a case, the solid state memory may be disposed between interface controller 720 and read channel circuit 710 where it operates as a pass through to disk platter 778 when requested data is not available in the solid state memory or when the solid state memory does not have sufficient storage to hold a newly written data set. Based upon the disclosure provided herein, one of ordinary skill in the art will recognize a variety of storage systems including both disk platter 778 and a solid state memory.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In other cases, the one part of a given system, block or circuit may be implemented in software or firmware, while other parts are implemented in hardware.

In conclusion, the invention provides novel systems, devices, methods and arrangements for processing data from a storage medium. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscriber line systems. Therefore, the above description should not be taken as limiting the scope of the invention, which is defined by the appended claims.

What is claimed is:

1. A data processing system, the system comprising:
   an analog to digital converter circuit operable to convert an analog input into a series of digital samples;
   an inter-track interference mitigation circuit operable to reduce inter-track interference from the series of digital samples to yield a corrected series of samples;
   an equalizer circuit operable to apply an equalization algorithm to the corrected series of samples to yield an equalized output; and
   a data processing circuit operable to apply a combination of a data detection algorithm and a data decoding algorithm to the equalized output to yield an originally written data set.

2. The system of claim 1, wherein the inter-track interference mitigation circuit comprises:
   a filter circuit operable to filter a data set derived from a track adjacent to the track from which the analog input is derived to yield inter-track interference values corresponding to the analog input; and
   a summation circuit operable to subtract the inter-track interference values from the series of digital samples to yield the corrected series of samples.

3. The system of claim 2, wherein the filter circuit is a digital finite impulse response circuit governed by a plurality of filter taps.

4. The system of claim 2, wherein the data set derived from the track adjacent to the track from which the analog input is derived is selected from a group consisting of: an x-sample data set, and a y-sample data set.

5. The system of claim 2, wherein the data set derived from the track adjacent to the track from which the analog input is derived is generated by re-reading the track adjacent to the track from which the analog input is derived.

6. The system of claim 2, wherein the data set derived from the track adjacent to the track from which the analog input is derived is generated by buffering data generated during prior processing of the data set derived from the track adjacent to the track from which the analog input is derived.

7. The system of claim 1, wherein the equalizer circuit is a digital finite impulse response circuit.

8. The system of claim 1, wherein the equalizer circuit is a recursive equalizer circuit including a buffer circuit operable to hold a previous equalized output.

9. The system of claim 1, wherein the analog input is a first analog input derived from a first read sensor, wherein the series of digital samples is a first series of digital samples, wherein the analog to digital converter circuit is a first analog to digital converter circuit, wherein the inter-track interference mitigation circuit is a first inter-track interference mitigation circuit, wherein the corrected series of samples is a first corrected series of samples, the system further comprising:
   a second analog to digital converter circuit operable to convert a second analog input derived from a second read sensor into a second series of digital samples;
   a second inter-track interference mitigation circuit operable to reduce inter-track interference from the second series of digital samples to yield a second corrected series of samples; and
   wherein the equalizer circuit is a joint equalizer circuit operable to apply a joint equalization algorithm to a combination of the first corrected series of samples and the second corrected series of samples to yield the equalized output.

10. The system of claim 9, wherein:
   the first inter-track interference mitigation circuit includes:
      a first filter circuit operable to filter a data set derived from a track adjacent to the track from which the first analog input is derived to yield a first set of inter-track interference values corresponding to the first analog input, wherein operation of the first filter circuit is governed at least in part by a first set of filter taps; and
      a first summation circuit operable to subtract the first set of inter-track interference values from the first series of digital samples to yield the first corrected series of samples; and
   the second inter-track interference mitigation circuit includes:
      a second filter circuit operable to filter the data set derived from the track adjacent to the track from which the first analog input is derived to yield a second set of inter-track interference values corresponding to the second analog input, wherein operation of the second filter circuit is governed at least in part by a second set of filter taps; and
      a second summation circuit operable to subtract the second set of inter-track interference values from the second series of digital samples to yield the second corrected series of samples.

11. The system of claim 1, wherein the system is implemented as part of an integrated circuit.

12. The system of claim 1, wherein the system is incorporated in a hard disk drive including a storage medium that includes a track from which the analog input is derived, and an adjacent track that is adjacent to the track from which the analog input is derived.

13. The system of claim 1, wherein the inter-track interference mitigation circuit is operable to reduce inter-track interference from the series of digital samples by calculating first estimated inter-track interference values from a first side of a target track and second estimated inter-track interference values from a second side of a target track to yield a corrected series of samples.

14. A data storage device, the data storage device comprising:
   a storage medium;
   a read/write head assembly disposed in relation to the storage medium;
   an analog to digital converter circuit operable to convert an information set from target track on the storage medium via the read/write head assembly into a sample set;

an inter-track interference mitigation circuit operable to reduce inter-track interference from the sample set to yield a corrected series of samples; and a read channel circuit including:
  an equalizer circuit operable to equalize the corrected series of samples to yield a data input;
  a data detector circuit operable to apply a data detection algorithm to a detector input derived from the data input to yield a detected output; and
  a data decoder circuit operable to apply a data decoding algorithm to the detected output to yield a decoded data set.

15. The device of claim 14, wherein the inter-track interference mitigation circuit comprises:
  a filter circuit operable to filter a data set derived from a track adjacent to the target track to yield inter-track interference values corresponding to the analog input; and
  a summation circuit operable to subtract the inter-track interference values from the sample set to yield the corrected series of samples.

16. A data processing system, the system comprising:
  an analog to digital converter circuit operable to convert an analog input into a series of digital samples;
  an inter-track interference mitigation circuit including:
    a filter circuit operable to filter a data set derived from a track adjacent to the track from which the analog input is derived to yield inter-track interference values corresponding to the analog input; and
    a summation circuit operable to subtract the inter-track interference values from the series of digital samples to yield a corrected series of samples; and
  an equalizer circuit operable to apply an equalization algorithm to the corrected series of samples to yield an equalized output.

17. The system of claim 16, wherein the filter circuit is a digital finite impulse response circuit governed by a plurality of filter taps.

18. The system of claim 16, wherein the data set derived from the track adjacent to the track from which the analog input is derived is selected from a group consisting of: an x-sample data set, and a y-sample data set.

19. The system of claim 16, wherein the data set derived from the track adjacent to the track from which the analog input is derived is generated by re-reading the track adjacent to the track from which the analog input is derived.

20. The system of claim 16, wherein the data set derived from the track adjacent to the track from which the analog input is derived is generated by buffering data generated during prior processing of the data set derived from the track adjacent to the track from which the analog input is derived.

21. The system of claim 16, the system further comprising:
  a data processing circuit operable to apply a combination of a data detection algorithm and a data decoding algorithm to the equalized output to yield an originally written data set.

* * * * *